(12) United States Patent
Takezoe

(10) Patent No.: US 10,794,109 B2
(45) Date of Patent: Oct. 6, 2020

(54) WINDOW GLASS SUPPORTING STRUCTURE

(71) Applicant: Nissan Motor Co., Ltd., Kanagawa (JP)

(72) Inventor: Ryo Takezoe, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 38 days.

(21) Appl. No.: 16/343,670

(22) PCT Filed: Oct. 19, 2016

(86) PCT No.: PCT/JP2016/080951
§ 371 (c)(1),
(2) Date: Apr. 19, 2019

(87) PCT Pub. No.: WO2018/073911
PCT Pub. Date: Apr. 26, 2018

(65) Prior Publication Data
US 2020/0056420 A1 Feb. 20, 2020

(51) Int. Cl.
*E06B 3/56* (2006.01)
*B60J 1/00* (2006.01)
*B60J 1/02* (2006.01)

(52) U.S. Cl.
CPC .......... *E06B 3/56* (2013.01); *B60J 1/004* (2013.01); *B60J 1/02* (2013.01)

(58) Field of Classification Search
CPC .............. E06B 3/56; B60J 1/004; B60J 1/02
See application file for complete search history.

(56) References Cited

U.S. PATENT DOCUMENTS

| 8,328,273 B2 | 12/2012 | Baroggi et al. |
| 2012/0133179 A1 | 5/2012 | Baroggi et al. |

FOREIGN PATENT DOCUMENTS

| JP | S58102320 U | 7/1983 |
| JP | S6325621 U | 2/1988 |
| JP | 2001-354031 A | 12/2001 |
| JP | 2005-96616 A | 4/2005 |
| JP | 2008520479 A | 6/2008 |
| JP | 2009-12604 A | 1/2009 |
| JP | 2013-103532 A | 5/2013 |
| JP | 2016-16837 A | 2/2016 |
| JP | 2016-94109 A | 5/2016 |
| WO | 2002/016721 A1 | 2/2002 |

*Primary Examiner* — D Glenn Dayoan
*Assistant Examiner* — Melissa Ann Bonifazi
(74) *Attorney, Agent, or Firm* — Osha Liang LLP

(57) ABSTRACT

A window frame includes an opening portion and a joining portion formed along an inner periphery of the opening portion and bonded to an outer periphery of a window glass. The window glass includes a plurality of corner portions formed in corner regions in the outer periphery of the window glass and connection side portions formed in the outer periphery of the window glass and connecting the adjacent corner portions to one another. An adhesive portion includes first adhesive portions bonding the corner portions of the window glass to the window frame and second adhesive portions bonding the connection side portions of the window glass to the window frame. Adhesion force per unit peripheral length in the first adhesive portions is greater than adhesion force per unit peripheral length in the second adhesive portions.

3 Claims, 2 Drawing Sheets

WINDOW GLASS SUPPORTING STRUCTURE

BACKGROUND

Technical Field

The present invention relates to a window glass supporting structure.

Related Art

Structures for supporting a window glass on a window frame of a vehicle body include one described in, for example, Patent Literature 1.

The window portion structure described in Patent Literature 1 includes a window frame portion, and a closing member formed to be capable of closing a window formed in the window frame portion. The window portion structure described in Patent Literature 1 further includes a first adhesive portion which is interposed between the window frame portion and a periphery of the closing member and which bonds the closing member to the window frame portion, and a second adhesive portion which is provided alongside a portion of the first adhesive portion between the window frame portion and the periphery of the closing member.

The window portion structure described in Patent Literature 1 allows adjustment of vibration characteristics of the closing member while reducing constraints on a vehicle body structure.

Patent Literature 1: Japanese Patent Application Publication No. 2009-12604

SUMMARY OF INVENTION

In some cases, when vibration caused by traveling of a vehicle inputted into a vehicle body deforms the vehicle body, adhesive supporting a window glass on a window frame expands and contracts and this promotes deformation of an opening portion in the window frame. In the supporting structure as described in Patent Literature 1, although the vibration of the window glass can be reduced, the deformation of the window frame cannot be sufficiently reduced. The deformation of the opening portion in the window frame which may occur when the vehicle vibrates may affect the handling stability, ride comfort, quietness, and the like of the vehicle. Accordingly, the present application recognizes that measures for sufficiently reducing this deformation may be desirable.

A window glass supporting structure according to one or more embodiments of the present invention may improve the handling stability, ride comfort, quietness, and the like of a vehicle by sufficiently reducing deformation of an opening portion in a window frame even if the deformation occurs when the vehicle vibrates.

A window glass supporting structure according to one or more embodiments of the present invention includes a window frame, a window glass, and an adhesive portion. The window frame includes an opening portion, and a joining portion formed along an inner periphery of the opening portion and bonded to an outer periphery of the window glass. The window glass includes a plurality of corner portions formed in corner regions in the outer periphery of the window glass, and connection side portions formed in the outer periphery of the window glass and connecting the adjacent corner portions to one another. The adhesive portion includes first adhesive portions bonding the corner portions of the window glass to the window frame, and second adhesive portions bonding the connection side portions of the window glass to the window frame. The adhesion force per unit peripheral length in the first adhesive portions is greater than adhesion force per unit peripheral length in the second adhesive portions.

The window glass supporting structure according to one or more embodiments of the present invention may improve the handling stability, ride comfort, quietness, and the like of a vehicle by sufficiently reducing deformation of an opening portion in a window frame even if the deformation occurs when the vehicle vibrates.

DETAILED DESCRIPTION

Figure 1:
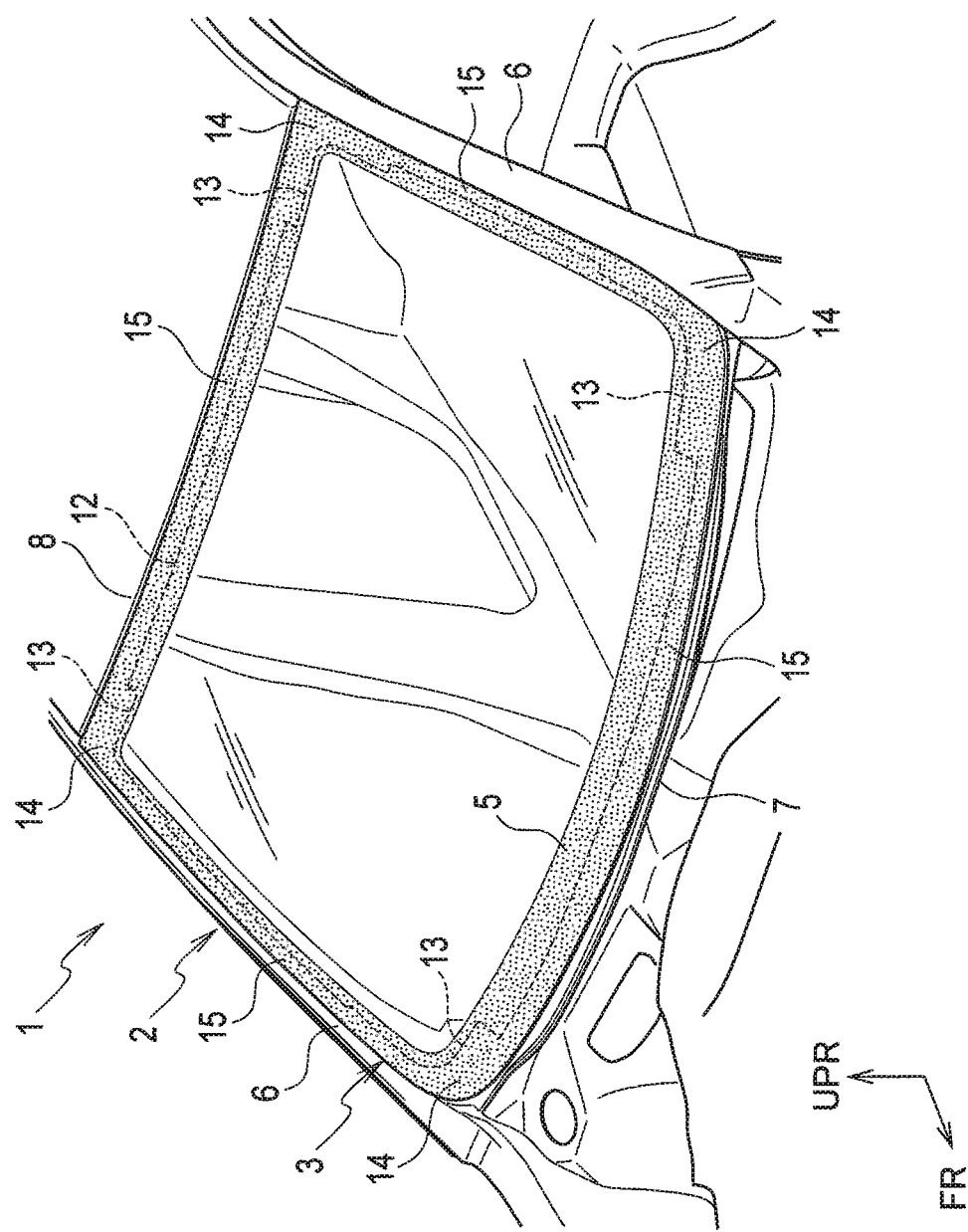
FIG. 1 is a perspective view of a window glass supporting structure according to one or more embodiments of the present invention.

Embodiments of the present invention are described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Below, a description is given of an example in which one or more embodiments of the present invention is applied to a supporting structure of a front window glass in a vehicle. Note that, in the drawings, the arrow FR indicates the vehicle front side, and the arrow UPR indicates the vehicle upper side.

Figure 2:
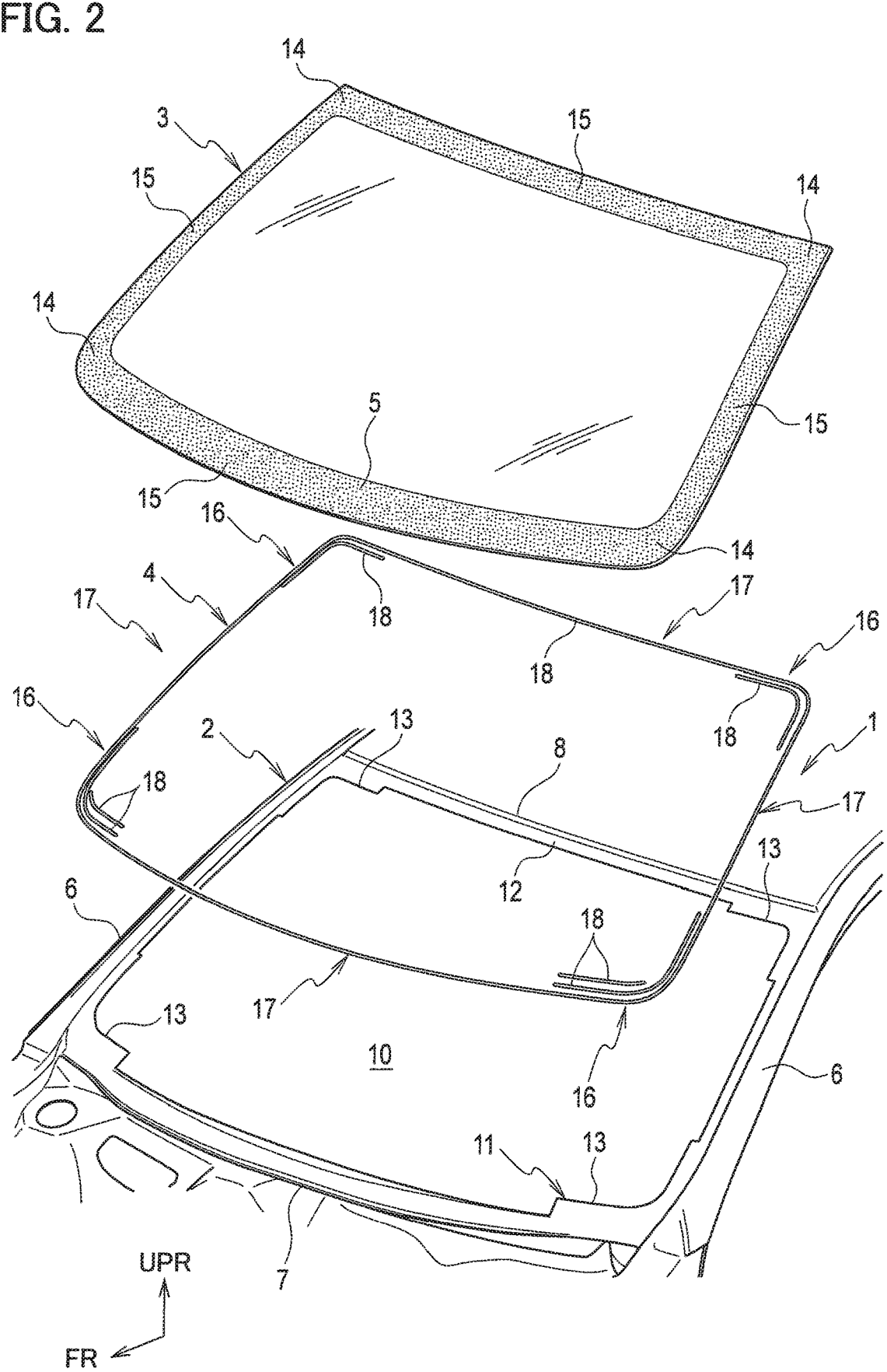
FIG. 2 is an exploded perspective view of the window glass supporting structure according to one or more embodiments of the present invention.

The window glass supporting structure according to one or more embodiments of the present invention is described based on FIGS. 1 and 2.

As illustrated in FIGS. 1 and 2, a window frame 2 is formed in a front portion of a vehicle body 1 according to one or more embodiments of the present invention, and a window glass 3 is supported on the window frame 2. An outer periphery of the window glass 3 is bonded to a joining portion 11 of the window frame 2 by interposing an adhesive portion 4 between the outer periphery of the window glass 3 and the joining portion 11 of the window frame 2. Note that the reference numeral 5 in the drawing denotes a black print portion formed in the outer periphery of the window glass 3.

The window frame 2 includes paired left and right front pillars 6, 6 arranged on both sides of the window glass 3 in a vehicle width direction, a cowl portion 7 arranged on the lower side of the window glass 3, and a front roof rail 8 arranged on the upper side of the window glass 3. The window frame 2 is a quadrilateral frame shaped body including a quadrilateral opening portion 10, and a joining portion 11 which is formed along an inner periphery of the opening portion 10 and which is bonded to the outer periphery of the window glass 3.

The joining portion 11 of the window frame 2 includes a flange portion 12 formed over the entire inner periphery of the opening portion 10, and the flange portion 12 is provided in the front pillars 6, the cowl portion 7, and the front roof rail 8. Moreover, extending portions 13 protruding inward from the flange portion 12 are formed in the flange portion 12 at positions corresponding to corner portions 14 of the window glass 3. The adhesion surface (area) in the joining portion 11 of the window frame 2 for the corner portions 14 of the window glass 3 is increased by the formation of the extending portions 13. The extending portions 13 are covered with the black print portion 5 of the window glass 3 and do not affect the visibility of an occupant.

The window glass 3 is a quadrilateral glass sheet including the multiple corner portions 14 which are formed in corner regions in the outer periphery of the window glass 3, and connection side portions 15 which are formed in the outer periphery of the window glass 3 and which connect the adjacent corner portions 14 to one another. In this description, the "corner portions" in the window glass 3 include not only rounded or chamfered portions in corners of a polygonal glass but also portions around the rounded or chamfered portions.

The adhesive portion 4 includes first adhesive portions 16 interposed between the corner portions 14 of the window glass 3 and the joining portion 11 of the window frame 2, and second adhesive portions 17 interposed between the connection side portions 15 of the window glass 3 and the joining portion 11 of the window frame 2. Adhesion force per unit peripheral length in the first adhesive portions 16 is set greater than adhesion force per unit peripheral length in the second adhesive portions 17.

Specifically, the first adhesive portions 16 and the second adhesive portions 17 are made of glass adhesive (glass glue) linearly applied to the flange portion 12 and the extending portions 13 of the window frame 2 along a peripheral direction of the opening portion 10. The glass adhesive is not limited to particular adhesive and any publicly known glass adhesive can be used. Application lines 18 of the adhesive are formed in the joining portion 11 by the application of the adhesive to the joining portion 11.

In one or more embodiments of the present invention, as illustrated in FIG. 2, the number of the applied lines 18 of the adhesive in the first adhesive portions 16 is set greater than the number of the applied lines 18 of the adhesive in the second adhesive portions 17 to increase the adhesion force per unit peripheral length in the first adhesive portions 16. In other words, an application amount of the adhesive per unit peripheral length in the first adhesive portions 16 is made greater than an application amount of the adhesive per unit peripheral length in the second adhesive portions 17.

In one or more embodiments of the present invention, the number of the applied lines 18 of the adhesive in each of the second adhesive portions 17 is one (one row) while the number of the applied lines 18 of the adhesive in each of the first adhesive portions 16 is more than one (more than one row). Moreover, in one or more embodiments of the present invention, the number of the applied lines 18 in each of the first adhesive portions 16 corresponding to the lower portion of the window glass 3 is set greater than the number of the applied lines 18 in each of the first adhesive portions 16 corresponding to the upper portion of the window glass 3. The configuration is not limited to this and may be such that the number of the applied lines 18 in each of the first adhesive portions 16 corresponding to the lower portion of the window glass 3 is the same as the number of the applied lines 18 in each of the first adhesive portions 16 corresponding to the upper portion of the window glass 3. Moreover, the number of the applied lines 18 in each of the first adhesive portions 16 corresponding to the upper portion of the window glass 3 may be set greater than the number of the applied lines 18 in each of the first adhesive portions 16 corresponding to the lower portion of the window glass 3.

Furthermore, although not illustrated, the adhesion force per unit peripheral length in the first adhesive portions 16 may be made greater by setting the width of the applied line 18 of the adhesive in the first adhesive portions 16 greater than the width of the applied line 18 of the adhesive in the second adhesive portions 17. This can also make the application amount of the adhesive per unit peripheral length in the first adhesive portions 16 greater than the application amount of the adhesive per unit peripheral length in the second adhesive portions 17.

Moreover, although the adhesion force is set to be increased in all four corner portions 14 of the window glass 3 in one or more of the above embodiments, the portions where the adhesion force is increased may be limited to three portions or less or only to one portion.

Operations and effects of one or more embodiments of the present invention are described below.

(1) The window glass supporting structure according to one or more embodiments of the present invention includes the window frame 2 formed in the vehicle body 1, the window glass 3 supported on the window frame 2, and the adhesive portion 4 interposed between the window glass 3 and the window frame 2. The window frame 2 includes the opening portion 10, and the joining portion 11 formed along the inner periphery of the opening portion 10 and bonded to the outer periphery of the window glass 3. The window glass 3 includes the multiple corner portions 14 formed in the corner regions in the outer periphery of the window glass 3, and the connection side portions 15 formed in the outer periphery of the window glass 3 and connecting the adjacent corner portions 14 to one another. The adhesive portion 4 includes the first adhesive portions 16 interposed between the corner portions 14 of the window glass 3 and the joining portion 11 of the window frame 2, and the second adhesive portions 17 interposed between the connection side portions 15 of the window glass 3 and the joining portion 11 of the window frame 2. The adhesion force per unit peripheral length in the first adhesive portions 16 is greater than the adhesion force per unit peripheral length in the second adhesive portions 17.

Deformation of the opening portion 10 in the window frame 2 which may occur when the vehicle vibrates was analyzed. As a result, it was found that the deformation of the corner portions 14 of the window glass 3 was the greatest. In other words, it can be said that the corner portions 14 of the window glass 3 can contribute most to reducing the deformation of the opening portion 10 in the window frame 2 which may occur when the vehicle vibrates. Accordingly, in the window glass supporting structure according to one or more embodiments of the present invention, the adhesion force in the first adhesive portions 16 interposed between the corner portions 14 of the window glass 3 and the joining portion 11 of the window frame 2 is increased. This can reduce the amount of deformation of the vehicle body 1 outside the window glass 3.

Accordingly, the window glass supporting structure according to one or more embodiments of the present invention can sufficiently reduce the deformation of the opening portion 10 in the window frame 2 which may occur when the vehicle vibrates and thereby improve the handling stability, ride comfort, quietness, and the like of the vehicle.

Note that it is conceivable to increase the plate thickness of a vehicle body frame member and add reinforcement members and reinforcement bars to sufficiently reduce the deformation of the opening portion 10 in the window frame 2 which may occur when the vehicle vibrates. However, increasing the plate thickness of a vehicle body frame member and adding reinforcement members and reinforcement bars leads to large increases in cost and vehicle body weight. Meanwhile, the deformation of the window frame 2 which may occur when the vehicle vibrates can be sufficiently reduced without large increases in cost and vehicle body weight by limiting the portions to increase the adhesion force to the corner portions 14 of the window glass 3 as in one or more embodiments of the present invention.

(2) The joining portion 11 includes the flange portion 12 formed over the entire inner periphery of the opening portion 10 and the extending portions 13 formed to protrude inward from the flange portion 12 at positions corresponding to the corner portions 14 of the window glass 3.

This can increase the adhesion surface in the joining portion 11 of the window frame 2 for the corner portions 14 of the window glass 3. Moreover, the deformation of the window frame 2 which may occur when the vehicle vibrates can be sufficiently reduced without large increases in cost and vehicle body weight by limiting the portions to increase the adhesion surface in the joining portion 11 of the window frame 2 to the corner portions 14 of the window glass 3 as in one or more embodiments of the present invention.

(3) The adhesive portion 4 bonds the outer periphery of the window glass 3 and the joining portion 11 of the window frame 2 to each other via the adhesive linearly applied to the joining portion 11 of the window frame 2 along the peripheral direction. The number of the applied lines 18 of the adhesive in the first adhesive portions 16 is greater than the number of the applied lines 18 of the adhesive in the second adhesive portions 17.

The adhesion force per unit peripheral length in the first adhesive portions 16 can be thereby set greater than the adhesion force per unit peripheral length in the second adhesive portions 17. Moreover, the same adhesive can be used for the first adhesive portions 16 and the second adhesive portions 17. Then, the step of applying the adhesive can be designed more freely because an adhesive of any specifications and a facility under any conditions can be used.

(4) The following configuration may be employed instead of setting the number of the applied lines 18 of the adhesive in the first adhesive portions 16 greater than the number of the applied lines 18 of the adhesive in the second adhesive portions 17. The width of the applied line 18 of the adhesive in the first adhesive portions 16 is set greater than the width of the applied line 18 of the adhesive in the second adhesive portions 17.

Also in this configuration, the adhesion force per unit peripheral length in the first adhesive portions 16 can be set greater than the adhesion force per unit peripheral length in the second adhesive portions 17. Moreover, the same adhesive can be used for the first adhesive portions 16 and the second adhesive portions 17. Then, the step of applying the adhesive can be designed more freely because an adhesive of any specifications and a facility under any conditions can be used.

Although embodiments of the present invention have been described above, the present invention is not limited to the above embodiments. It is apparent to those skilled in the art that various changes and modifications can be made.

Although an example in which one or more embodiments the present invention is applied to the supporting structure for a front window glass of a vehicle is described above, the present invention is not limited to this. One or more embodiments of the present invention can be applied also to, for example, a supporting structure for a rear window glass of a vehicle and a supporting structure for a quarter window glass.

Moreover, although an example in which the adhesion force in the first adhesive portions is increased by increasing the number or width of the applied lines of the adhesive is described above, the present invention is not limited to this. For example, the adhesion force in the first adhesive portions can be increased by using different adhesives varying in the adhesion force for the first adhesive portions and the second adhesive portions. Specifically, the configuration may be such that the adhesive with great adhesion force is used for the first adhesive portions and the adhesive with smaller adhesion force than the adhesive for the first adhesive portions is used for the second adhesive portions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 vehicle body
2 window frame
3 window glass
4 adhesive portion
10 opening portion
11 joining portion
12 flange portion
13 extending portion
14 corner portion
15 connection side portion
16 first adhesive portion
17 second adhesive portion
18 applied line

The invention claimed is:

1. A window glass supporting structure comprising:
a window frame formed in a vehicle body;
a window glass supported on the window frame; and
an adhesive portion interposed between the window glass and the window frame,
wherein the window frame includes:
an opening portion, and
a joining portion formed along an inner periphery of the opening portion and bonded to an outer periphery of the window glass,
wherein the window glass includes:
a plurality of corner portions formed in corner regions in the outer periphery of the window glass, and
connection side portions formed in the outer periphery of the window glass and connecting the adjacent corner portions to one another,
wherein the adhesive portion includes:
first adhesive portions interposed between the corner portions of the window glass and the joining portion of the window frame, and
second adhesive portions interposed between the connection side portions of the window glass and the joining portion of the window frame,
wherein an adhesion force per unit peripheral length in the first adhesive portions is greater than an adhesion force per unit peripheral length in the second adhesive portions, and wherein the joining portion includes:
- a flange portion formed over the entire inner periphery of the opening portion, and
- extending portions formed to protrude inward from the flange portion at positions corresponding to the corner portions of the window glass.

2. The window glass supporting structure according to claim 1,
wherein the adhesive portion bonds the outer periphery of the window glass and the joining portion of the window frame to each other via adhesive linearly applied to the joining portion of the window frame along a peripheral direction, and
wherein the number of applied lines of the adhesive in the first adhesive portions is greater than the number of applied lines of the adhesive in the second adhesive portions.

3. The window glass supporting structure according to claim 1,
wherein the adhesive portion bonds the outer periphery of the window glass and the joining portion of the window frame to each other via adhesive linearly applied to the joining portion of the window frame along a peripheral direction, and
wherein a width of an applied line of the adhesive in the first adhesive portions is greater than a width of an applied line of the adhesive in the second adhesive portion.

* * * * *